United States Patent
Endo (10) Patent No.: US 10,298,076 B2
(45) Date of Patent: May 21, 2019

(54) THREE-PHASE PERMANENT MAGNET-TYPE SYNCHRONOUS MOTOR

(75) Inventor: Kenji Endo, Kawasaki (JP)

(73) Assignee: CLEAN CRAFT LIMITED, Kanagawa (JP)

( * ) Notice: Subject to any disclaimer, the term of this patent is extended or adjusted under 35 U.S.C. 154(b) by 678 days.

(21) Appl. No.: 14/378,822

(22) PCT Filed: Jul. 30, 2012

(86) PCT No.: PCT/JP2012/069325
§ 371 (c)(1),
(2), (4) Date: Aug. 14, 2014

(87) PCT Pub. No.: WO2013/125069
PCT Pub. Date: Aug. 29, 2013

(65) Prior Publication Data
US 2015/0008786 A1    Jan. 8, 2015

(30) Foreign Application Priority Data
Feb. 24, 2012  (JP) ................. 2012-038656

(51) Int. Cl.
*H02K 21/00* (2006.01)
*H02K 1/16* (2006.01)
(Continued)

(52) U.S. Cl.
CPC .......... *H02K 1/165* (2013.01); *H02K 1/2786* (2013.01); *H02K 21/00* (2013.01); *H02K 21/22* (2013.01);
(Continued)

(58) Field of Classification Search
CPC ...... H02K 1/165; H02K 1/2786; H02K 21/00; H02K 21/22; H02K 7/006; H02K 2201/03; H02K 2203/12; H02K 2213/03
(Continued)

(56) References Cited

U.S. PATENT DOCUMENTS 4,913,258 A * 4/1990 Sakurai ................ B60K 7/0007
                                                              180/242
5,030,864 A * 7/1991 Van Hout .............. H02K 21/24
                                                              310/156.26

(Continued)

FOREIGN PATENT DOCUMENTS

CA        2743366 A1    5/2010
DE   102007038988 A1    2/2009

(Continued)

OTHER PUBLICATIONS

English translation of JP 2004153886; May 2004; Sato Kazuo; Japan.*

(Continued)

*Primary Examiner* — Bernard Rojas
*Assistant Examiner* — Ahmed Elnakib
(74) *Attorney, Agent, or Firm* — Vorys, Sater, Seymour and Pease LLP (57) ABSTRACT

A three-phase permanent magnet-type synchronous motor configured to significantly reduce cogging torque. The motor includes a rotator and stator each having either permanents magnets or teeth. The number of magnetic poles of the rotator or stator is P and a number of slots of the stator or rotator is N, and a fraction of 2N/3P has a value greater than zero and less than one. The tooth width of the teeth of the stator or rotator in a circumferential direction is ½ of the slot pitch of the stator or rotator.

20 Claims, 5 Drawing Sheets

(51) Int. Cl.
*H02K 21/22* (2006.01)
*H02K 1/27* (2006.01)
*H02K 7/00* (2006.01)

(52) U.S. Cl.
CPC ......... *H02K 7/006* (2013.01); *H02K 2201/03* (2013.01); *H02K 2203/12* (2013.01); *H02K 2213/03* (2013.01)

(58) Field of Classification Search
USPC .......... 310/216.009, 216.112, 67 R, 216.069
See application file for complete search history.

(56) References Cited

U.S. PATENT DOCUMENTS

| | | | | |
|---|---|---|---|---|
| 5,418,414 A * | 5/1995 | Ackermann | ......... | H02K 1/2786 310/156.43 |
| 5,537,020 A * | 7/1996 | Couture | ..................... | H02P 6/20 318/400.13 |
| 5,753,991 A * | 5/1998 | Couture | ................. | H02K 1/165 310/156.46 |
| 5,942,873 A * | 8/1999 | Nakano | ................ | H02K 1/2786 310/156.47 |
| 6,008,563 A * | 12/1999 | Baba | ...................... | H02K 1/146 310/194 |
| 6,104,117 A | 8/2000 | Nakamura et al. | | |
| 6,943,459 B2 * | 9/2005 | Hartman | ................... | H02J 7/32 290/1 C |
| 7,321,176 B2 * | 1/2008 | Strothmann | ........... | H02K 1/146 310/156.15 |
| 7,701,100 B2 * | 4/2010 | Morel | .................... | H02K 1/278 310/156.19 |
| 2002/0171305 A1 * | 11/2002 | Coupart | ............... | B60K 7/0007 310/156.08 |
| 2003/0052567 A1 * | 3/2003 | Yonekura | ............... | H02K 21/16 310/254.1 |
| 2006/0113859 A1 * | 6/2006 | Lu | ........................ | H02K 1/148 310/216.015 |
| 2006/0138883 A1 * | 6/2006 | Yagai | .................... | H02K 3/522 310/71 |
| 2007/0252465 A1 | 11/2007 | Sasaki et al. | | |
| 2007/0296302 A1 * | 12/2007 | Fei | ........................ | H02K 1/148 310/216.009 |
| 2008/0073995 A1 | 3/2008 | Niguchi et al. | | |
| 2010/0066188 A1 | 3/2010 | Matsuda | | |
| 2011/0021068 A1 | 1/2011 | Lee | | |
| 2011/0210640 A1 | 9/2011 | Elser | | |

FOREIGN PATENT DOCUMENTS

| | | |
|---|---|---|
| EP | 0872943 A1 | 10/1998 |
| JP | 9-37496 A | 2/1997 |
| JP | 10-42531 A | 2/1998 |
| JP | 11-500897 A | 1/1999 |
| JP | 2002-233122 A | 8/2002 |
| JP | 2007-295768 A | 11/2007 |
| JP | 2008-86064 A | 4/2008 |
| JP | 2009-284727 A | 12/2009 |
| JP | 2010-98937 A | 4/2010 |
| JP | 2010-178442 A | 8/2010 |
| JP | 2011-166868 A | 8/2011 |
| WO | 2010/054425 A1 | 5/2010 |

OTHER PUBLICATIONS

International Search Report dated Oct. 9, 2012 for PCT/JP2012/069325 to SIM-Drive Corporation filed Jul. 30, 2012.

* cited by examiner

THREE-PHASE PERMANENT MAGNET-TYPE SYNCHRONOUS MOTOR

CROSS-REFERENCE TO RELATED APPLICATIONS

This is a § 371 National Stage Application of International Application No. PCT/JP2012/069325 filed on Jul. 30, 2012, claiming the priority of Japanese Patent Application No. 2012-038656 filed on Feb. 24, 2012.

TECHNICAL FIELD

The present invention relates to a preferred three-phase permanent magnet-type synchronous motor that can obtain smooth rotation in a driving motor or similar portion in an electric car.

BACKGROUND ART

A three-phase permanent magnet-type synchronous motor typically employs a motor where 2N/3P is an integer assuming that the number of magnetic poles in a rotator is P and the number of slots in a stator is N. However, this type of motor has a problem with a large cogging torque. Therefore, to reduce this cogging torque, a technique is proposed. This technique employs a fractional-slot motor where 2N/3P is not an integer and specifies the combination of the number of magnetic poles P and the number of slots N so as to reduce the cogging torque.

For example, Patent Literature 1 discloses that N/P is set to satisfy 1<N/P≤1.2 assuming that the number of magnetic poles is P and the number of slots is N so as to reduce the cogging torque.

Patent Literature 2 discloses that the number of slots N is set to satisfy N=3×[P/2−INT (P/10)] assuming that the number of magnetic poles is P and the number of slots is N so as to reduce the cogging torque. However, INT (P/10) denotes a value of the quotient of P divided by 10.

CITATION LIST

Patent Literature

Patent Literature 1: Japanese Unexamined Patent Application Publication No. 2003-250254
Patent Literature 2: Japanese Unexamined Patent Application Publication No. 2003-032983

SUMMARY OF INVENTION

Technical Problem

Patent Literatures 1 and 2 described above disclose that the fractional slot motor is employed and a predetermined relationship is provided between the number of magnetic poles and the number of slots so as to reduce the cogging torque of the motor. However, it is not possible to sufficiently decrease the cogging torque only by providing the predetermined relationship between the number of magnetic poles and the number of slots.

Therefore, in order to improve these conventional techniques, the present invention has been made to provide a three-phase permanent magnet-type synchronous motor that significantly reduces a cogging torque by employing a fractional slot motor and providing a specific relationship between a slot pitch and a slot width (tooth width) of a stator or a rotator in a permanent magnet-type synchronous motor.

Solution to Problem

The invention of claim 1 is a three-phase permanent magnet-type synchronous motor. In the three-phase permanent magnet-type synchronous motor, assuming that a number of magnetic poles of a rotator or a stator is P and a number of slots of the stator or the rotator is N, a fraction of 2N/3P is not an integer. The stator or the rotator includes a tooth facing a surface of a magnetic pole of the rotator or the stator via a void, and a tooth width of the tooth in a circumferential direction is approximately ½ of a slot pitch of the stator or the rotator.

The invention of claim 2 is the three-phase permanent magnet-type synchronous motor according to the invention of claim 1 in which the stator or the rotator has a tooth tip where corner portions on both sides have curved surfaces.

The invention of claim 3 is the three-phase permanent magnet-type synchronous motor according to the invention of claim 1 or 2 in which the number of magnetic poles of the rotator or the stator is 20 and the number of slots of the stator or the rotator is 24.

The invention of claim 4 is the three-phase permanent magnet-type synchronous motor according to any one of the inventions of claims 1 to 3. In the three-phase permanent magnet-type synchronous motor, the three-phase permanent magnet-type synchronous motor employs an outer rotor type. The tooth of the stator has a radial cross section with an approximately uniform shape from a tooth tip portion to a tooth root portion or a radial cross section with a larger tooth root portion than a tooth tip portion so as to allow mounting a winding unit from the tooth tip portion. The winding unit is preliminarily wound by a coil.

The invention of claim 5 is any of the inventions of claims 1 to 4 in which the three-phase permanent magnet-type synchronous motor is an in-wheel motor for an electric car.

Advantageous Effects of Invention

According to the inventions of claims 1 to 5, the motor is the fractional slot type. The tooth tip width in the circumferential direction of the stator or the rotator is designed to be ½ of the slot pitch. Thus, the cogging torque can become approximately zero. In particular, according to claim 4, furthermore, the tooth of the stator has the cross section with an approximately uniform shape from the tooth tip portion to the tooth root portion or the cross section with the larger tooth root portion than the tooth tip portion. Thus, the winding unit that is preliminarily assembled by the coil can be mounted from the tooth tip. This can facilitate the winding work and ensures a high occupancy rate of the winding inside of the slot.

DETAILED DESCRIPTION OF EMBODIMENTS

The present invention is a three-phase permanent magnet-type synchronous motor. In the three-phase permanent magnet-type synchronous motor, assuming that a number of magnetic poles of a rotator or a stator is P and a number of slots of the stator or the rotator is N, a fraction of 2N/3P is not an integer. The stator or the rotator includes a tooth facing a surface of a magnetic pole of the rotator or the stator via a void, and a tooth width of the tooth in a circumferential direction is approximately ½ of a slot pitch of the stator or the rotator.

This allows significantly reducing the cogging torque.

[Embodiment 1]

Figure 1:
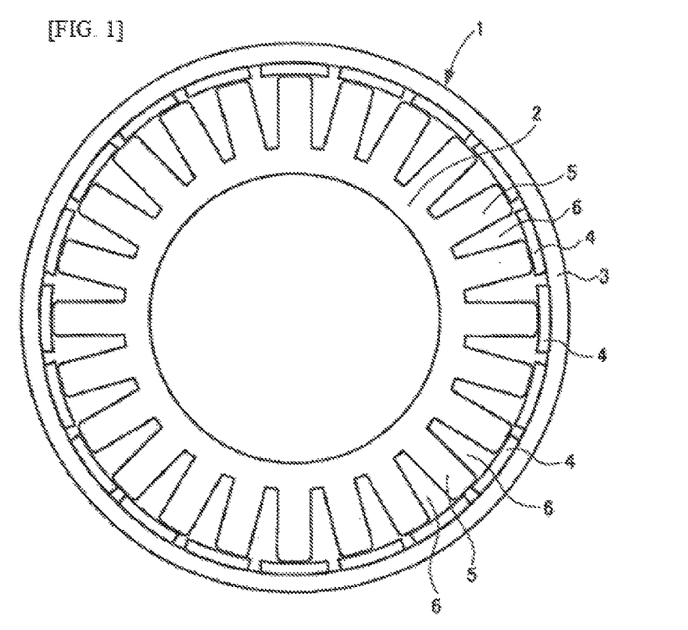
FIG. 1 is a cross-sectional view illustrating a relationship between a rotator and a stator in an outer-rotor motor according to an embodiment 1 of the present invention.

The following describes an embodiment 1 of the present invention based on the drawings. This outer-rotor motor 1 is constituted of a stator 2 and a rotator 3. The stator 2 has an approximately circular shape. The rotator 3 has a cylindrical shape, and rotates on the outer side of the stator 2 in the circumferential direction. The rotator 3 has an inner surface with multiple permanent magnets 4. Facing the permanent magnets 4, a plurality of teeth 5 is arranged. The plurality of teeth 5 is radially disposed at a predetermined interval on the outer periphery of the stator 2. A slot 6 is formed between the teeth 5 adjacent to each other.

The number of magnetic poles in the rotator 3 is 20. The number of the slots 6 in the stator 2 is 24. Accordingly, assuming that the number of magnetic poles in the rotator 3 is P and the number of slots in the stator 2 is N, 2N/3P becomes 0.8, thus achieving a fractional slot. The tooth 5 of the stator 2 in the radial direction has a square cross section that has the same size and the same shape from the tooth tip portion to the tooth root portion. While the illustration is omitted, a coil is wound around the outer periphery of each tooth 5 in the stator 2.

Figure 2:
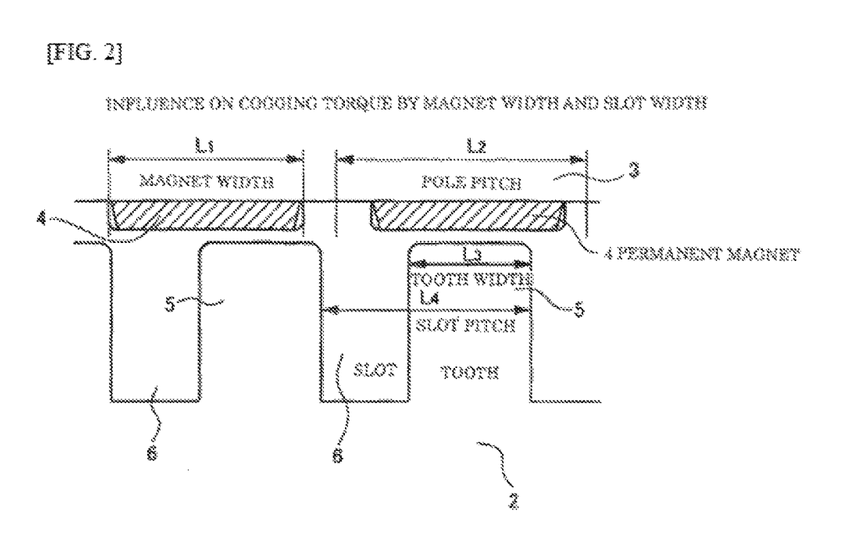
FIG. 2 is a partially enlarged view of FIG. 1.

FIG. 2 illustrates a relationship between a width $L_1$ and a pole pitch $L_2$ of the permanent magnet 4 in the rotator 3 and a tooth width $L_3$ of the tooth 5 and a slot pitch $L_4$ of the slot 6 in the stator 2. The ratio of the magnet width $L_1$ to the pole pitch $L_2$ is generally set to about 0.6 to 0.8. However, during the analysis described later, ⅔ the magnet width $L_1$ is set to the pole pitch $L_2$. The ratio of the slot pitch $L_4$ to the tooth width $L_3$ in the tooth 5 is approximately twice.

Figure 3:
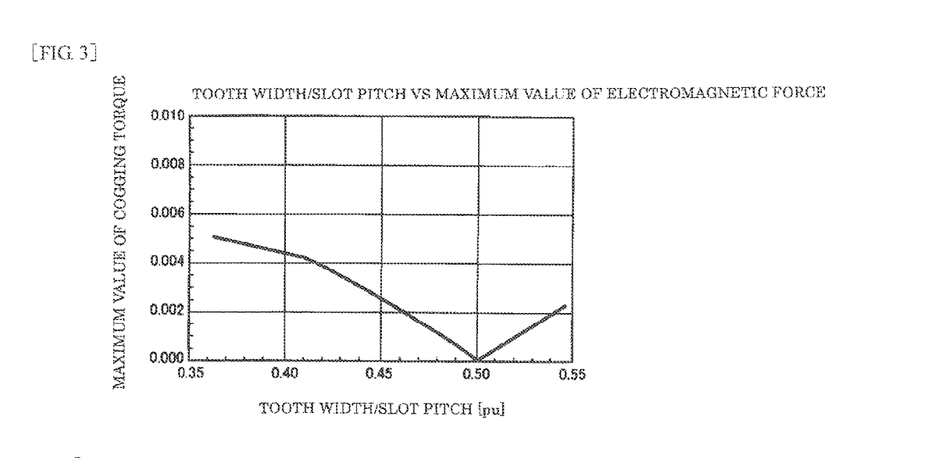
FIG. 3 is an analysis graph of a cogging torque based on FIG. 2.

Both of a magnet magnetomotive force (A) on the rotator 3 side and a magnetic susceptance (X) of the stator 2 are multiplied together as a magnetic flux density (B). This magnetic flux density (B) is squared as a magnetic energy distribution (D=B²). Then, D is integrated over the whole circumference as the total amount of magnetic energy (Qm). When a displacement (x) in the rotation direction of the rotator 3 and an electromagnetic force (F) are defined, the algorithm for calculating the electromagnetic force (F) is as follows.

$$B[x] = k_1 \cdot \lambda[x] \cdot A[x] \qquad \text{[Formula 1]}$$

$$Qm[x] = k_2 \cdot \int B[x]^2 \cdot dx$$

$$F = k_3 \frac{\partial Qm[x]}{\partial x}$$

where $k_1, k_2,$ and $k_3$ are constants, where $k_1$, $k_2$, and $k_3$ are constants,
A: Magnet Magnetomotive Force
λ: Susceptance
B: Magnetic Flux Density
Qm: Total Magnetic Energy
x: Displacement
F: Electromagnetic Force FIG. 3 illustrates a result of analysis using mathematical analysis software (whose product name is "Mathematica"). FIG. 3 is a graph illustrating a change in maximum value of a cogging torque by changing the tooth width $L_3$ with respect to the slot pitch $L_4$.

In a simulation result where that the number of magnetic poles is set to 20 and the number of slots (the number of teeth) is set to 24, the cogging torque becomes substantiality zero when the tooth width $L_3$/the slot pitch $L_4$=½. Here, also in the case where the number of magnetic poles, the number of slots, and the relationship between the number of magnetic poles and the number of slots are changed, a similar trend is seen.

Figure 4:
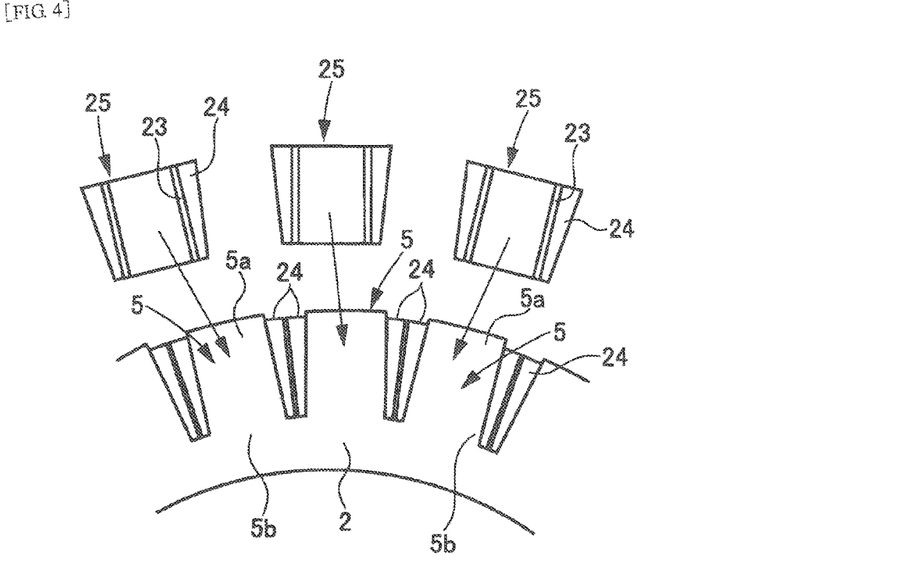
FIG. 4 is an explanatory diagram of a process for mounting winding units on teeth of the stator according to the embodiment 1 of the present invention.

In the present invention, as illustrated in FIG. 1, wings projecting from a tooth tip portion 5a in each tooth 5 to both sides are removed. In the case where the cross-sectional shape is the same from the tooth tip portion 5a to a tooth root portion 5b like this or the cross-sectional shape becomes gradually larger from the tooth tip portion 5a toward the tooth root portion 5b, as illustrated in FIG. 4, a large number of winding units 25 that are each formed by preliminarily wounding a coil 24 on a bobbin 23 are manufactured. This winding unit 25 is inserted into each tooth 5 of the stator 2 from the distal end so as to simply wind the coil.

A known method is used, for example, the outer side of the coil 24 in this winding unit 25 is fixed with a wrapping paper or the coil 24 is fixed with an adhesive such that the coil 24 wound on the bobbin 23 is not collapsed. After the winding units 25 are mounted on the respective teeth 5, the winding units 25 are fixed to the teeth 5 as necessary and then the coils 24 are coupled to one another.

With the above-described configuration, the coil 24 is wound using a flyer or similar tool outside of the stator 2. This allows sufficient winding without taking into consideration a conventional nozzle space and allows utilizing a conductor with a rectangular cross section or similar material for the coil. In a trial calculation, in the case where the number of magnetic poles is 20 and the number of slots is 24, a 1.5 times larger amount of coil can be housed compared with coil winding with a nozzle method.

Figure 5:
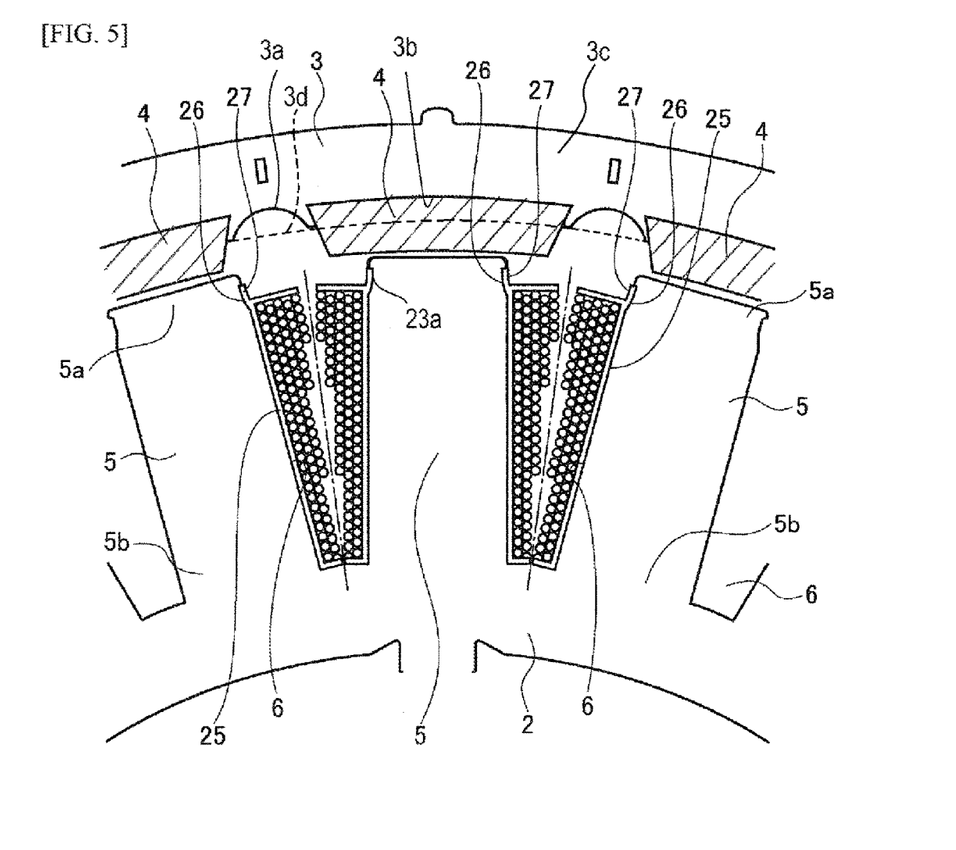
FIG. 5 is a cross-sectional view where the winding units are mounted on the teeth of the stator according to the embodiment 1 of the present invention.

After the winding units 25 are mount on the teeth 5, as illustrated in FIG. 5, slot portions 26 disposed in distal end portions of the teeth 5 receive protruding portions 27 located at the distal ends 23a of the bobbins of the winding units 25. The protruding portions 27 are fitted into the slot portions 26. This allows retaining and locking of the winding units 25 with respect to the teeth 5 such that the winding units are not displaced or thrown out from the slots 6. It is preferred to round the distal end portions of the teeth (i.e. teeth tip portions 5a) in the circumferential direction to prevent torque noise at high frequency and facilitate insertion of the winding units 25. The rotator 3 has a base 3*c* defining an inner surface with a first set of transverse retaining slots 3*b* for multiple permanent magnets 4 and a set of transverse recesses 3*a* which are respective indentations between adjacent transverse retaining slots 3*b*. A said transverse recess 3*a* is between adjacent transverse retaining slots 3*b*. FIG. 5 shows one transverse recess between each pair of adjacent transverse retaining slots for the multiple permanent magnets. Each transverse recess 3*a* is indented relative to a phantom circle 3*d* connecting the end points of the transverse recesses 3*a* 3*a*. FIG. 5 shows a portion of the phantom circle 3*d*. The permanent magnets 4 are provided with tapering side edges cooperating with inner tapering edges of transverse retaining slots 3*b* provided in a retaining surface of the rotator 3 together configured to retain and lock each permanent magnet 4 within each respective slot during operation of the motor. The retaining surface being the inner tapering edges of the transverse retaining slot 3*b* as well as the back surface of the retaining slot in contact with the permanent magnet 4. The permanent magnets 4 and slots are configured to retain only a base portion of each permanent magnet in each respective slot of the retaining surface while an exposed portion of each permanent magnet 4 protrudes outwardly from the retaining surface of the rotator 3 in a direction towards teeth tip portions 5*a* of the teeth 5 of the stator 2. FIG. 5 also shows the rotator 3 is provided with a recess 3*a* facing the stator 2 at a portion between the permanent magnets 4 which are adjacent.

[Embodiment 2]

Figure 6:
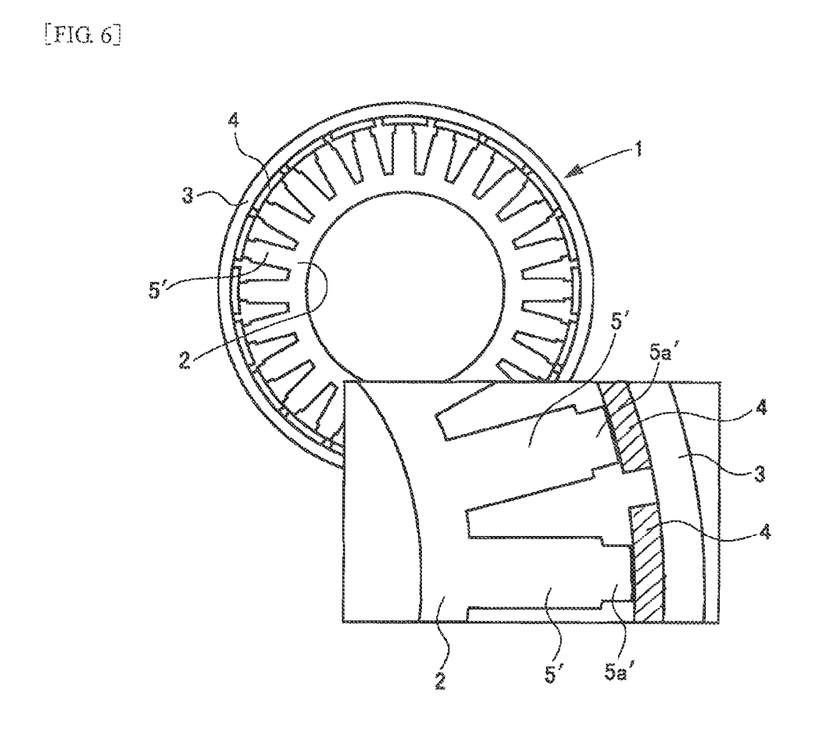
FIG. 6 is a cross-sectional view illustrating a relationship between a rotator and a stator of an outer-rotor motor according to an embodiment 2 of the present invention.

FIG. 6 illustrates an embodiment 2 for the shape of tooth of the present invention. As illustrated in the drawing, a tooth tip portion 5*a*' of a tooth 5' facing the permanent magnet 4 of the outer rotor has a width that is ½ of a slot pitch while the portion other than the tooth tip portion 5*a*' of the tooth 5' has a larger tooth width. The embodiment 2 is otherwise similar to the embodiment 1.

This embodiment 2 also employs a fractional slot and uses an outer rotor to allow inserting the winding unit 25 into each tooth 5. With the fractional slot, a magnetic-flux utilization rate can be maintained even without tooth heads (wings). The tooth width can be actively adjusted so as to reduce the pulsation torque.

Figure 7:
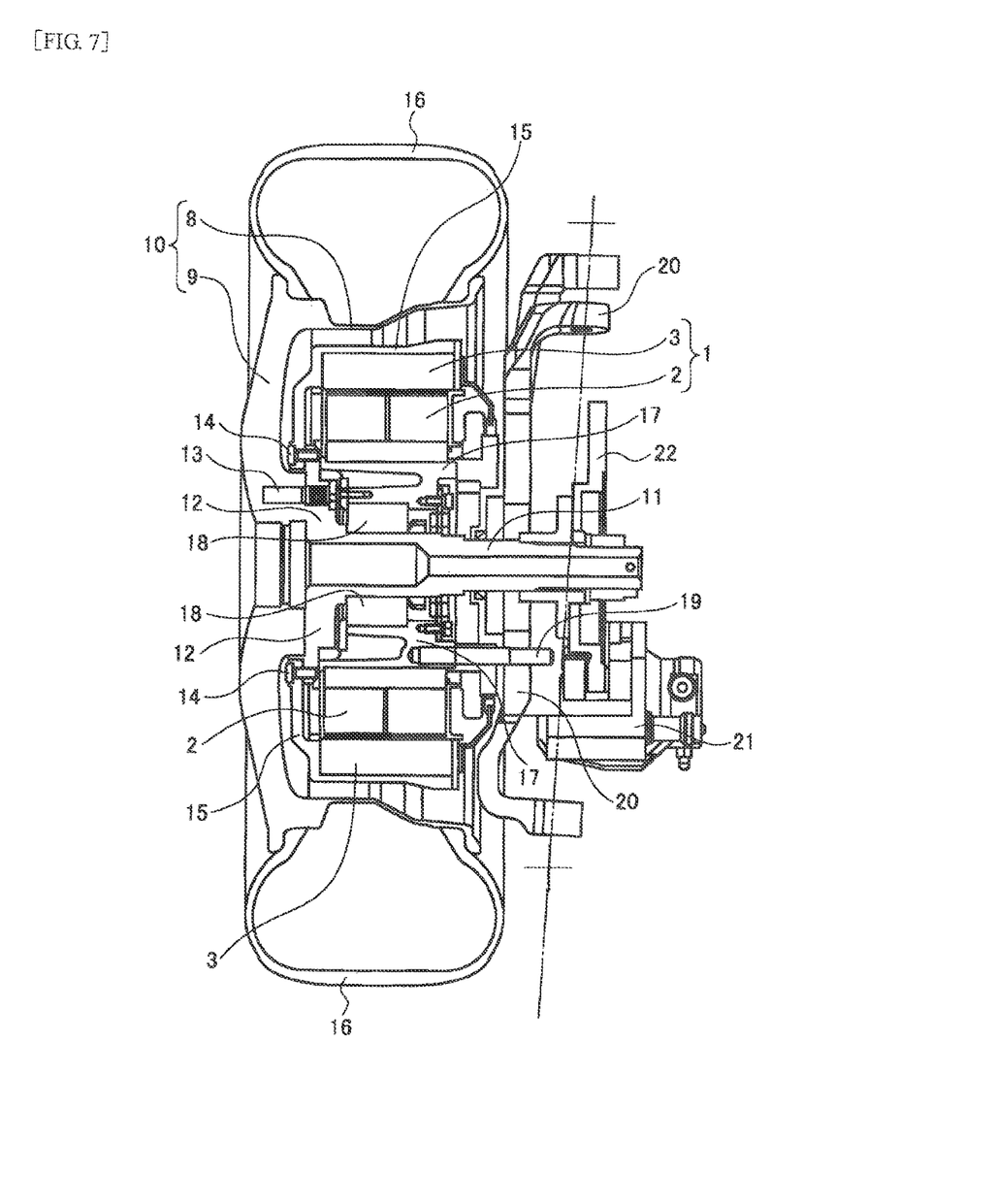
FIG. 7 is a schematic configuration diagram where the outer-rotor motor according to the embodiment 1 of the present invention is applied as an in-wheel motor for an electric car.

Next, FIG. 7 illustrates a schematic configuration diagram when the three-phase permanent magnet-type synchronous motor of the present invention is applied to an in-wheel motor for an electric car.

As illustrated in the drawing, the outer-rotor motor 1 that includes the stator 2 and the rotator 3 outside of the stator 2 is housed in a wheel 10. The wheel 10 includes a rim 8 in an approximately cylindrical shape and a disk 9. The disk 9 of the wheel 10 is secured to a flange 12 with a bolt 13. The flange 12 is disposed at the end portion of a shaft 11. The flange 12 is secured to a motor cover 15 with a bolt 14. The motor cover 15 covers the outer side of the motor 1.

Accordingly, by rotation of the rotator 3, this rotation is transmitted to the motor cover 15, the flange 12, and the wheel 10 in this order. Thus, a tire 16 mounted on the rim 8 is rotated. The stator 2 is secured to an inner frame 17 on the inner side of the stator 2. Between the inner frame 17 and the shaft 11, a bearing 18 intervenes. The inner frame 17 is secured to a knuckle 20 with a bolt 19. Additionally, a disk caliper 21 is secured to the knuckle 20 with the bolt 19 so as to freely grip a brake disc 22 that is secured to the outer periphery of the shaft 11.

While in the above-described embodiments the examples of the outer-rotor motor has been described, the present invention is applicable to an inner-rotor motor.

REFERENCE SIGNS LIST

1 outer-rotor motor
2 stator
3 rotator
4 permanent magnet
5 tooth
5*a* tooth tip portion
5*b* tooth root portion
5' tooth
5*a*' tooth tip portion
6 slot
8 rim
9 disk
10 wheel
11 shaft
12 flange
13 bolt
14 bolt
15 motor cover
16 tire
17 inner frame
18 bearing
19 bolt
20 knuckle
21 disk caliper
22 brake disc
23 bobbin
24 coil
25 winding unit
26 slot portion
27 protruding portion

What is claimed is:

1. A three-phase permanent magnet-type synchronous motor, comprising:

a rotator and a stator, wherein the rotator or the stator is a first component having a plurality of spaced apart permanent magnets disposed within a plurality of spaced apart transverse retaining slots provided into an inner side of the first component, the plurality of spaced apart magnets defining an inner circular-shaped surface; and wherein a member selected from the group consisting of the stator and the rotator which is not the first component is a second component, wherein the second component is disposed within the first component, the second component having a plurality of spaced apart teeth having respective tooth root portions and outer tooth tip portions with outer tooth tip portion surfaces defining an outer circular-shaped surface having respective tooth slots located between adjacent said teeth, wherein the permanent magnets have inner curved surfaces facing the tip end portions of the spaced apart teeth, the inner curved surfaces defining the inner circular-shaped surface of the first component, wherein each said permanent magnet, respectively embedded in said transverse retaining slot at the surface of said first component facing the second component, is shaped such that the inner curved surface of the permanent magnet facing the tip end portions of the spaced apart teeth and an outer circumferential surface of the permanent magnet are respectively curved outwardly, wherein the motor is configured so that the circular-shaped surface of the rotator is rotated in close proximity to the circular-shaped surface of the stator which is stationary during operation of the motor, wherein a number of magnetic poles of the first component is P and a number of slots of the second component is N, wherein 2N/3P has a value greater than zero and less than one, wherein each tooth of the second component has a tooth width in a circumferential direction of ½ of a slot pitch of the stator or the rotator, wherein each permanent magnet is provided with side transverse tapering edges cooperating with inner transverse tapering edges of the transverse retaining slots provided into the inner side of the rotator or stator for retaining and locking each permanent magnet within each respective retaining slot to prevent movement relative to the rotator or stator during operation of the motor, wherein the permanent magnets and transverse retaining slots located into the inner side of the rotator or stator first component are configured to retain only a base portion of each permanent magnet in each respective transverse retaining slot in the inner side of the rotator or stator first component while an exposed portion of each permanent magnetic protrudes outwardly from the inner side of the rotator or stator first component in a direction towards the tip end portions of the teeth of the stator or rotator second component, wherein the first component is provided with transverse recesses facing the second component, the transverse recesses are provided into the inner side of the first component, the transverse recesses located between adjacent said permanent magnets, wherein the first component has a base defining an inner surface with the first set of transverse retaining slots for the multiple permanent magnets and the transverse recesses between adjacent transverse retaining slots, wherein a said transverse recess is between adjacent transverse retaining slots, and wherein each transverse recess is indented relative to a phantom circle connecting end points of the indentations.

2. The three-phase permanent magnet-type synchronous motor according to claim 1, wherein corner portions on transverse edges of opposed sides of each outer tooth tip portion have indentations defined by curved surfaces.

3. The three-phase permanent magnet-type synchronous motor according to claim 2, wherein the number of magnetic poles of the rotator or the stator is 20 and the number of slots of the stator or the rotator is 24.

4. The three-phase permanent magnet-type synchronous motor according to claim 2, wherein the three-phase permanent magnet-type synchronous motor employs an outer rotor type, and the tooth of the stator has a radial cross section with a uniform shape from the outer tooth tip portion to the tooth root portion or a radial cross section with a larger said tooth root portion than said outer tooth tip portion so as to allow mounting a winding unit from the outer tooth tip portion, the winding unit being preliminarily wound by a coil.

5. The three-phase permanent magnet-type synchronous motor according to claim 2, wherein the three-phase permanent magnet-type synchronous motor is an in-wheel motor for an electric car.

6. The three-phase permanent magnet-type synchronous motor according to claim 1, wherein the number of magnetic poles of the rotator or the stator is 20 and the number of slots of the stator or the rotator is 24.

7. The three-phase permanent magnet-type synchronous motor according to claim 1, wherein the three-phase permanent magnet-type synchronous motor employs an outer rotor type, and the tooth of the stator has a radial cross section with a uniform shape from the outer tooth tip portion to the tooth root portion or a radial cross section with a larger said tooth root portion than said outer tooth tip portion so as to allow mounting a winding unit from the tooth tip portion, the winding unit being preliminarily wound by a coil.

8. The three-phase permanent magnet-type synchronous motor according to claim 7, further comprising the winding unit mounted on the respective teeth from the tooth tip portion, the winding unit being preliminarily wound by the coil.

9. The three-phase permanent magnet-type synchronous motor according to claim 1, wherein the three-phase permanent magnet-type synchronous motor is an in-wheel motor for an electric car.

10. The three-phase permanent magnet-type synchronous motor according to claim 9, wherein the three-phase permanent magnet-type synchronous motor employs an outer rotor type, and the tooth of the stator has a radial cross section with a uniform shape from the tooth tip portion to the tooth root portion or a radial cross section with a larger tooth root portion than said tooth tip portion so as to allow mounting a winding unit from the tooth tip portion, the winding unit being preliminarily wound by a coil, wherein the three-phase permanent magnet-type synchronous motor is an in-wheel motor for an electric car.

11. The three-phase permanent magnet-type synchronous motor according to claim 10, wherein the outer-rotor motor that includes the stator and the rotator outside of the stator is housed in a wheel of the car; the wheel includes a rim and a disk; the disk is secured to a flange; the flange is disposed at the end of a shaft; the flange is secured to a motor cover; wherein rotation of the rotator is transmitted to the motor cover, the flange, and the wheel in this order for rotating a tire mounted on the wheel of the car.

12. The three-phase permanent magnet-type synchronous motor according to claim 1,
wherein the three-phase permanent magnet-type synchronous motor employs an outer rotor type, and the tooth of the stator has a radial cross section selected from the group consisting of:
  (a) a uniform shape from the outer tooth tip portion to the tooth root portion, but for transverse side slot portions located on opposite sides of each tooth or
  (b) a radial cross section with a larger said tooth root portion than said outer tooth tip end portion and transverse side slot portions located on opposite sides of each tooth
  so as to allow mounting a winding unit from the tooth tip portion, the winding unit being preliminarily wound by a coil,
wherein the winding unit is mounted to opposed walls of adjacent teeth, to locate the windings in the tooth slots located between adjacent teeth of the stator or rotator, the teeth each having transverse side slot portions being indentations located on opposite sides of each tooth and located at the outer tooth tip portion to be adjacent to an end of each tooth, the winding units configured to protrude into opposed said side slot portions on the adjacent teeth to retain and lock the winding within the tooth slots between the adjacent teeth during operation of the motor to prevent the windings from being displaced therefrom.

13. The three-phase permanent magnet-type synchronous motor according to claim 12, wherein the winding units each having two opposed radial protruding extensions, extending distally relative to the windings, which respectively protrude into the opposed side slot portions on the adjacent teeth to retain and lock the winding within the tooth slots between the adjacent teeth during operation of the motor to prevent the windings from being displaced therefrom.

14. The three-phase permanent magnet-type synchronous motor according to claim 1, further comprising winding units mounted on the teeth, wherein a transverse side slot portion being an indentation is disposed in the distal end portion of each tooth and opposed protruding portions are disposed at a distal end of a bobbin of the winding unit, wherein the protruding portions are fitted to the respective transverse side slot portion to retain each winding on each tooth.

15. The three-phase permanent magnet-type synchronous motor according to claim 14, wherein the distal end portion in the circumferential direction of the tooth tip portion is rounded.

16. The three-phase permanent magnet-type synchronous motor according to claim 1, wherein the three-phase permanent magnet-type synchronous motor employs an outer rotor type, and the tooth of the stator has a radial cross section with a uniform shape from a tooth tip portion to a tooth root portion so as to allow mounting a winding unit from the tooth tip portion, the winding unit being preliminarily wound by a coil.

17. The three-phase permanent magnet-type synchronous motor according to claim 1, wherein the three-phase permanent magnet-type synchronous motor employs an outer rotor type, and the tooth of the stator has a radial cross section with a larger tooth root portion than a tooth tip portion so as to allow mounting a winding unit from the tooth tip portion, the winding unit being preliminarily wound by a coil.

18. The three-phase permanent magnet-type synchronous motor according to claim 1, wherein the teeth have an absence of tooth heads.

19. The three-phase permanent magnet-type synchronous motor according to claim 1, wherein one transverse recess is between each pair of adjacent transverse retaining slots for the multiple permanent magnets.

20. A three-phase permanent magnet-type synchronous motor, comprising:
a rotator and a stator;
the rotator or the stator being a first component having a plurality of spaced apart permanent magnets disposed within a plurality of spaced apart transverse retaining slots provided into an inner side of the rotator or stator, the plurality of spaced apart magnets defining an inner circular-shaped surface of the rotator or stator; and
wherein a member selected from the group consisting of the stator and the rotator which is not the first component is a second component, the second component disposed within the first component, the second component having a plurality of outwardly extending spaced apart teeth having outer tip portions with outer tip portion surfaces defining an outer circular-shaped surface of the second component, the spaced apart teeth defining second component slots located between adjacent spaced apart teeth of the second component,
wherein the permanent magnets have inner curved surfaces facing the tip end portions of the spaced apart teeth, the inner curved surfaces defining the inner circular-shaped surface of the rotator or stator,
wherein the motor is configured so that the circular-shaped surface of the rotator is rotated in close proximity to the circular-shaped surface of the stator which is stationary during operation of the motor,
wherein a number of magnetic poles of the rotator or the stator is P and a number of slots of the stator or the rotator is N, wherein 2N/3P has a value greater than zero and less than one,
wherein each tooth of the second component has a tooth width in a circumferential direction of ½ of a slot pitch of the stator or the rotator,
wherein each permanent magnet is provided with transverse tapering edges cooperating with transverse tapering edges of the transverse retaining slots provided into the inner side of the first component for retaining and locking each permanent magnet within each respective retaining slot to prevent movement relative to the first component during operation of the motor,
wherein the first component is provided with transverse recesses located between adjacent permanent magnets, the transverse recesses are provided into the inner side of the first component, the transverse recesses facing the second component, wherein the first component has a base defining an inner surface with the first set of transverse retaining slots for the multiple permanent magnets and the transverse recesses between adjacent transverse retaining slots, wherein a said transverse recess is between adjacent transverse retaining slots, and wherein each transverse recess is indented relative to a phantom circle connecting end points of the indentations.

\* \* \* \* \*